Patented May 10, 1932

1,857,190

UNITED STATES PATENT OFFICE

HARRY LE B. GRAY AND CYRIL J. STAUD, OF ROCHESTER, NEW YORK, AND CHARLES S. WEBBER, OF SPRINGFIELD, MASSACHUSETTS, ASSIGNORS TO EASTMAN KODAK COMPANY, OF ROCHESTER, NEW YORK, A CORPORATION OF NEW YORK

PROCESS FOR THE HYDROLYSIS OF CELLULOSE ACETATE

No Drawing.  Application filed December 14, 1929.  Serial No. 414,208.

This invention relates to a process for the hydrolysis of cellulose acetate and particularly to the hydrolysis of cellulose acetate in the presence of ethylene chloride, also known as ethylene dichloride.

Cellulose triacetate as produced by the usual processes, of, for example, treating cellulosic material in acetic anhydride and acetic acid solution containing a catalyst, is obtained in the fibrous form if there is present in the acetylating bath a sufficient amount of a non-solvent of the cellulose triacetate, and in the absence of such a non-solvent a cellulose triacetate which is soluble in the solution is obtained. The soluble triacetate is generally hydrolyzed by simply destroying the anhydride, which has not reacted with the cellulose, with water and adding thereto a hydrolytic catalyst and holding the resultant solution until an acetone soluble product is obtained. The hydrolysis of the fibrous cellulose acetate, however, as well as precipitated cellulose triacetate, which, in many instances is separated from the acetylating bath prior thereto, is generally conducted by a solution of the cellulose acetate in a solvent such as acetic acid which dissolves both the cellulose triacetate and the acetone soluble cellulose acetate produced by the hydrolyzing reaction as well as the catalysts or hydrolysts that may be present. Investigators in this art have attempted, at various times, to substitute other solvent media for the acetic acid generally used but none of them have proven commercially important. Owing to the limited availability of the acetic acid it is now even more important than formerly that a suitable method of hydrolysis be used that will decrease the amount of acetic acid employed in the hydrolyzing bath.

An object of the present invention is to provide a process for the preparation of acetone soluble cellulose acetate by the hydrolysis of cellulose triacetate in the presence of ethylene chloride. A further object of this invention is to conduct the deacetylation of the cellulose triacetate in a bath in which part of the acetic acid has been replaced by ethylene chloride. Other objects will hereinafter appear.

We have found that a solution of ethylene chloride and acetic acid is a good solvent for cellulose triacetate as well as the hydrolyzing cellulose acetate although the ethylene chloride alone is not a solvent per se of either type of acetate. The use of this solvent mixture in a hydrolyzing bath results in the production of a cellulose acetate of excellent quality in regard to its viscosity, flexibility and durability and it likewise, due to its cost, reduces considerably the expense of hydrolyzing cellulose acetate.

We have found that ethylene chloride may be present in as great as 75 percent of the acetic acid present in the hydrolyzing bath. While ethylene chloride alone as stated above is not a solvent for cellulose triacetate or hydrolyzed cellulose acetate it becomes when admixed with glacial acetic acid or other lower aliphatic organic acid a solvent of all cellulose acetates down to the limit of acetone solubility, when there is as little as 25 percent of acetic acid dissolved therein. The solvent mixture is likewise a solvent for the hydrolyzing ingredients required to carry out this reaction such as water or alcohol and the usual mineral acid or other type of catalyst.

The hydrolysis is preferably conducted at a temperature of approximately 50° C. and after a period of from 18 to 24 hours the cellulose triacetate will be found to have been hydrolyzed to a solubility in acetone. The whole solution may be either immersed or preferably extruded into hot water which is kept at a temperature well above the boiling point of the ethylene chloride. The ethylene chloride flashes immediately from the solution and may by suitable collecting and condensing means be recovered for further use while the cellulose acetate will be found to have precipitated in a light fluffy form which can be readily and efficiently washed and dried.

We shall now give an example for carrying out our invention but it will be distinctly understood that we shall not be limited by the proportions or details therein given except as they are indicated in the appended claims.

88 parts of cellulose triacetate, either the precipitated cellulose acetate which has been formed in a solvent acetylating bath or the cellulose triacetate produced in fibrous form, is dissolved in a bath containing:

234 parts of glacial acetic acid, 312 parts of ethylene chloride, 26 parts of water, 23 parts of sodium acid sulfate monohydrate, .9 parts of sulfuric acid, and 2.7 parts of phosphoric acid (95%).

The cellulose triacetate will rapidly dissolve and after being placed in a suitable covered container at a temperature of approximately 50° C. and held for a period of 18 to 22 hours under these conditions will produce, after precipitation in hot water and thorough washing and drying, a cellulose acetate of excellent quality which is soluble in acetone. The ethylene chloride will, of course, be "flashed" or vaporized when the hydrolizing bath containing it is introduced into the hot water precipitant and the vapors so produced may be recovered by collecting and condensing them and by separation, all in known manner.

While the hydrolysis may be carried out as described in the above example, it is not essential that the cellulose triacetate be in a fibrous or precipitated form prior to this treatment, in as much as the hydrolysis may be conducted directly in an acetylation bath, in which the cellulose acetate is in solution, subsequent to the esterification without the necessity of precipitation and redissolving of the precipitate prior to the hydrolysis. Our treatment in this manner is particularly advantageous when used in conjunction with the esterifying process described in the co-pending applications of H. Le B. Gray, Serial No. 240,943 and H. Le B. Gray and C. J. Staud, Serial No. 328,054.

Various changes may be made in the proportions of ethylene chloride and glacial acetic acid employed providing the ratio of ethylene chloride to glacial acetic acid does not go above 4½ to 1 as well as in the proportion or types of hydrolysts or catalysts used in the hydrolyzing bath or, for that matter, in the degree of de-esterification of cellulose acetate obtained by the hydrolysis without departing from this invention or sacrificing any of its advantages.

What we claim as new and desire to be secured by Letters Patent of the United States is:

1. In the process for the manufacture of cellulose acetate the step which comprises hydrolyzing an organic acid solution of cellulose acetate in the presence of ethylene chloride.

2. In the process for the manufacture of cellulose acetate the step which comprises hydrolyzing an acetic acid solution of cellulose acetate in the presence of ethylene chloride and a mineral acid catalyst.

3. In the process for the manufacture of cellulose acetate the step which comprises hydrolyzing an acetic acid solution of cellulose acetate in the presence of ethylene chloride, a mineral acid catalyst and water and when an acetone soluble product has been obtained precipitating the hydrolyzed product in hot water.

4. In the process for the manufacture of cellulose acetate the step which comprises hydrolyzing an acetic acid solution of cellulose acetate in the presence of ethylene chloride, the ethylene chloride being at least 25 percent of the acetic acid present, a mineral acid catalyst and water and precipitating the acetone soluble product formed in a hot coagulating medium.

Signed at Rochester, New York this 6th day of December, 1929.

HARRY LE B. GRAY.
CYRIL J. STAUD.

Signed at Springfield, Mass. this 3rd day of December, 1929.

CHARLES S. WEBBER.